(12) United States Patent
Lingnau (10) Patent No.: US 11,072,036 B2
(45) Date of Patent: Jul. 27, 2021

(54) CONCENTRIC WELDED PIPES WITH CONDITION MONITORING CAPABILITY AND METHOD OF MANUFACTURE

(71) Applicant: Spinduction Weld, Inc., Calgary (CA)

(72) Inventor: David Grant Lingnau, Calgary (CA)

(73) Assignee: Spinduction Weld, Inc., Calgary (CA)

( * ) Notice: Subject to any disclaimer, the term of this patent is extended or adjusted under 35 U.S.C. 154(b) by 156 days.

(21) Appl. No.: 15/859,296

(22) Filed: Dec. 29, 2017

(65) Prior Publication Data

US 2018/0209565 A1 Jul. 26, 2018

Related U.S. Application Data

(60) Provisional application No. 62/439,894, filed on Dec. 29, 2016.

(51) Int. Cl.
| | | |
|---|---|---|
| *B23K 13/01* | (2006.01) | |
| *F16L 13/02* | (2006.01) | |
| *B23K 20/12* | (2006.01) | |
| *F16L 59/065* | (2006.01) | |
| *B23K 101/06* | (2006.01) | |

(52) U.S. Cl.
CPC .......... *B23K 13/015* (2013.01); *B23K 20/129* (2013.01); *B23K 2101/06* (2018.08); *F16C 2226/36* (2013.01); *F16L 13/0218* (2013.01); *F16L 59/065* (2013.01)

(58) Field of Classification Search
CPC .............. F16C 2226/36; B23K 13/015; B23K 2101/04; B23K 2101/06; B23K 2101/10; B23K 20/129; B23K 20/028; B23K 11/0073; B23K 11/02; F16L 13/0218; F16L 9/18; F16L 37/56; F16L 39/005
See application file for complete search history.

(56) References Cited

U.S. PATENT DOCUMENTS

| | | | |
|---|---|---|---|
| 4,542,846 A | | 9/1985 | Matsui et al. |
| 5,072,622 A | | 12/1991 | Roach |
| 5,551,484 A | | 9/1996 | Charboneau |
| 6,637,642 B1 * | | 10/2003 | Lingnau ................. B23K 13/00 228/112.1 |
| 8,998,067 B2 | | 4/2015 | Lehr |
| 2005/0212285 A1 | | 9/2005 | Haun |
| 2009/0000681 A1 * | | 1/2009 | Averbuch ................ F16L 9/042 138/112 |

\* cited by examiner

*Primary Examiner* — Christopher J Besler (74) *Attorney, Agent, or Firm* — Dean W. Amburn; Amburn Law PLLC (57) ABSTRACT

A method for solid-state, one-shot, butt-welding of multiple coaxial metal pipe subassemblies that have a prescribed annular clearance to allow them to be welded separately yet simultaneously is described. The nested pipes or tubes making up of these subassemblies can thus be joined end to end to form pipelines or wells for oil, gas and geothermal and the like with specific desired advantages over conventional single-wall pipelines or wells casings. The advantages include an ability to monitor the condition of all or selected portions of the pressure envelope constituted by the pipeline or well casing and thereby identify damage with ample advance warning before failure and leakage or major spills occur.

10 Claims, 8 Drawing Sheets

CONCENTRIC WELDED PIPES WITH CONDITION MONITORING CAPABILITY AND METHOD OF MANUFACTURE

RELATED APPLICATIONS

This application claims priority to and the benefit of U.S. Provisional Patent Application No. 62/439,894, filed on Dec. 29, 2016, the entire contents of which are hereby incorporated by reference.

TECHNICAL FIELD

The present invention generally relates to girth welded concentric metal pipes. More specifically it relates to an improved method for solid-state, one-shot, butt-welding of multiple coaxial metal pipe subassemblies that have a prescribed annular clearance to allow them to be welded separately yet simultaneously together in field environments, both onshore and offshore, as well as in factories for discrete pipe products.

BACKGROUND

In 1989, the Exxon Valdez oil spill disaster resulted in United States Congress enacting the Oil Pollution Act of 1990, mandating the use of double hull tankers—immediately in Prince William Sound and ultimately phasing up to a nationwide mandate by 2015. Double hull tankers have thus become the industry norm for oceanic shipping of oil. Lately, oil spills from pipelines have triggered sharp criticism, reminiscent of the Valdez event. Yet virtually all major industrial pipelines, specifically including oil and gas pipelines are still constructed the same way since first welded together, circa 1930; specifically, as a single wall, cylindrical steel conduit, assembled from roughly 10 meter long joints of pipe, joined end to end by girth welds executed in the field by arc welding. Fortunately, tankers have numerous personnel onboard at all times, whereas pipelines and wells operate unattended for 99% or more of their length for over 99% of their service life. Therefore, risk of compromise to the pipeline structure is a real and present concern, whether naturally occurring or otherwise.

Exacerbating the risks even more is the fact that virtually all pipelines and many well casings operate at pressures far greater than the surrounding environment, therefore even a small perforation through the pressure envelope quickly results in a large environmental disaster. Many improvements have come along in arc welding processes, steel grades, pipe quality, inspection capabilities and other involved technologies. However, no commercially practical method for building major pipelines or wells using double wall construction has ever been established. Heightened public concerns over recent pipeline leaks have only amplified this long felt need for a better method to build pipelines. Ideally it should be a mobile, field welding process for the girth welds which is able to simultaneously weld two or more close-fitting concentric pipes and also is: a) faster, to reduce typical construction times and costs; b) fully automated, to reduce weld defects and increase repeatability; c) solid state, to eliminate most of the possible sources of weld defects; and d) one-shot, to ensure uniformity of weld quality around the entire circumference of multiple concentric welds.

A rapid solid-state welding method is known and previously taught in U.S. Pat. No. 6,637,642, utilizing induction heating of the pipe ends in a non-reactive atmosphere, to quickly raise the endfaces up to the hot working temperature, which then are kinetically welded in a single rapid action of a few seconds duration, joining the entire circumference, all in unison. This will henceforth be referred to as the Induction-Kinetic Welding or "IKW" process. For example, current commercial use of the IKW process usually involves single wall tube-to-tube welds for manufacturing products such as drill pipe, marine risers, axle tubes, etc. However, this method has not been improved to have application to concentric pipes creating an annular space between the pipe layers for improved performance and monitoring. Therefore, there is a need for an improved method and the resulting pipes and pipeline having at least two concentric pipes creating an annular space therebetween.

SUMMARY

The invention provides an improved method for solid-state, one-shot, butt-welding of multiple coaxial metal pipe subassemblies that have a prescribed annular clearance to allow them to be welded separately yet simultaneously. The nested pipes or tubes making up of these subassemblies can thus be joined end to end to form pipelines or wells for oil, gas and geothermal and the like with specific desired advantages over conventional single-wall pipelines or wells casings. One of the advantages is the ability to monitor the condition of all or selected portions of the pressure envelope constituted by the pipeline or well casing and thereby identify damage with ample advance warning before failure and leakage or major spills occur.

The invention includes a method of sold-state induction-kinetic welding concentric pipes with an annular space therebetween, said method comprising heating endfaces of at least four metal pipes with an induction heating coil wherein the at least four pipes comprise two sets of at least two pipes concentrically arranged to provide a circumferential annular space between the two pipes; and forcing the endfaces of the at least four pipes together and rotating them in a kinetic energy welding manner wherein the ends of the at least four pipes are welded together wherein the annular space extends circumferentially in proximity to the welds. The invention also includes, repeating the above steps with another set of at least two pipes concentrically arranged, wherein the at least two pipes are welded to an opposite end of the previously welded pipes, wherein an annular space extends through several sections of pipes welded together end to end.

In addition, the invention includes, wherein the induction heating coil has at least four turns. The invention also includes, drilling a hole into the annular space and inserting a sensor to measure the volumetric pressure within the annular space. The invention includes, drilling a hole in the annular space and evacuating the air in the annular space, wherein the annular space is a vacuum insulator. Further, the invention includes, inserting spacers in the annular space to retain substantially equal spacing between the inner and outer pipes. The invention also includes, preparing the pipes for welding by swaging at least one of the inner and outer pipes to retain substantially equal spacing between the inner and outer pipes. The invention also includes, circumferentially displacing a portion of the ends of the outer pipes prior to welding, wherein the annular space is increased proximate to the area of the welds. The invention also includes, inserting a circumferential seal in the annular space on each side of at least two pipes in proximity to the area to be welded; after welding the at least two pipes together, drilling a hole into the annular space proximate to the welds and in between the seals; through the hole, pressure checking the integrity of the welds; and degrading the seals to open the annular space to extend through the length of the at least two pipes.

The invention also includes, the induction-kinetic welded pipes of the method as described above wherein the inner pipes and outer pipes share an induction-kinetic weld connecting the pipes together. The invention also includes, the induction-kinetic welded pipes of the method as described above, wherein the inside diameter of the inner pipes is less than 50 cm. The invention also includes, the induction-kinetic welded pipes of the method as described above, wherein the inner pipe is a different metal or metal alloy than the outer pipe.

The invention includes, a method of sold-state induction-kinetic welding pipes with an annular space circumferentially surrounding the weld, comprising heating four endfaces of at least two metal pipes with an induction heating coil having at least four turns, wherein the at least two pipes comprise at least one circumferential annular space proximate to the weld area; forcing the endfaces of the at least two pipes together and rotating them in a kinetic energy welding manner wherein the ends of the at least two pipes are welded together wherein the annular space extends circumferentially and between the welds; and drilling a hole into the annular space and pressure checking the integrity of the welds. The invention includes repeating the above steps with another pipe attached to an opposite of the previously welded pipes wherein the integrity of the welds is inspected in sequence.

The invention includes circumferentially displacing a portion of the ends of the out pipes prior to welding, wherein the annular space is increased proximate to the area of the welds. The invention includes the method as described above wherein pipes share an induction-kinetic weld connecting the pipes together.

The invention includes the induction-kinetic welded pipes of the above method wherein the inside diameter of the pipes is less than 50 cm. The invention includes the induction-kinetic welded pipes of the above method, wherein the inner pipe is a different metal or metal alloy than the outer pipe.

The invention includes a method of sold-state induction-kinetic welding concentric pipes with an annular space therebetween to a threaded pin end having an annular space therein, said method comprising heating two endfaces of two circumferential metal pipes and two endfaces of a threaded pin end having an annular space therein with an induction heating coil, wherein the pin end has threading across a conical surface extending at an angle of between 5 degrees and 30 degrees relative to a center axis of the metal pipes; forcing the endfaces of the two circumferential metal pipes together with the two endfaces of the threaded pin end and rotating them in a kinetic energy welding manner wherein the end pin is welded to the pipes, wherein the annular space extends circumferentially, and between the welds; and evacuating the annular space including the annular space within the pin end, wherein the annular space insulates the inner pipe.

The invention also includes, the above method further comprising manufacturing the pin end prior to welding it to the concentric pipes comprising the steps, forming a conical tube assembly having an outer conical surface and an inner circular co-plainer surface; welding a joiner ring onto the narrow end of the conical tube at an area of connection between the conical surface and inner circular co-plainer surface; and cutting a threading along the conical surface.

Therefore, it is an advantage of this invention to construct pipelines and well casings having double walls separated by an annular cavity for part or all of the axial length which then can be instrumented to provide condition monitoring for the entire service life. Early warning of breech of either the outer or inner wall before the other wall fails provides ample reaction time in most failure scenarios to locate and repair the damage before there is any leakage into the environment. Also, this invention enables the manufacture of discrete length finished products such as double wall insulated oil well tubing joints, thus providing superior performance, quality and cost savings.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION

In this invention, the final welded assembly consists of two or more nested butt welds separated by a prescribed annular space. The annular space may be continuous to allow for movement of a fluid within the annular space or limited to an area proximate to the weld to allow for testing the integrity of the weld. The creation of a sealed annular space also allows for the installation of various condition monitoring devices in the annular space to continuously validate integrity of the pressure envelope. The IKW process as known to those skilled in the art is as described in U.S. Pat. No. 6,637,642, which is fully incorporated herein as if repeated word for word.

Figure 1:
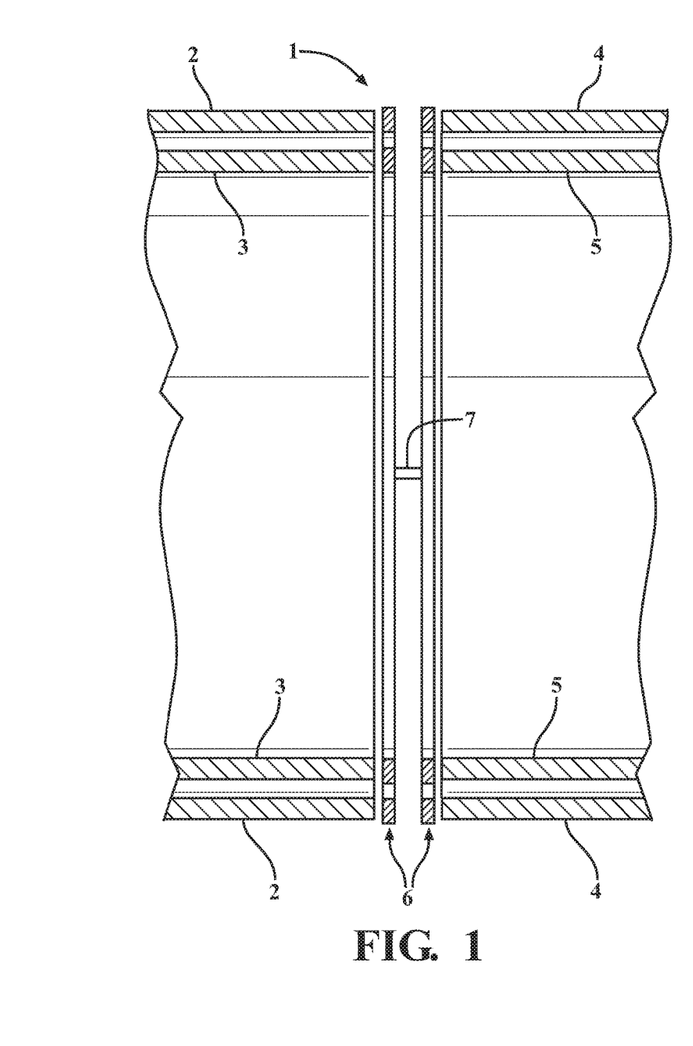
FIG. 1 is a schematic view of an induction-kinetic welding system for making welded concentric pipes of the invention.
Figure 1A:
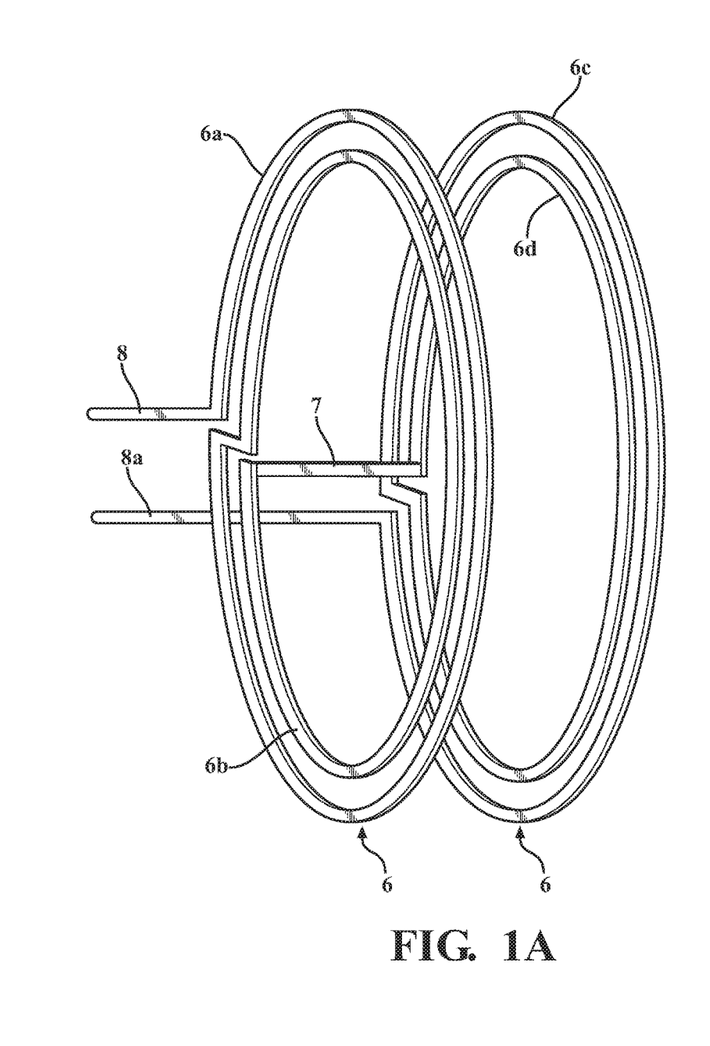
FIG. 1A is a schematic view of a four-turn induction coil as shown in FIG. 1.
Figure 1B:
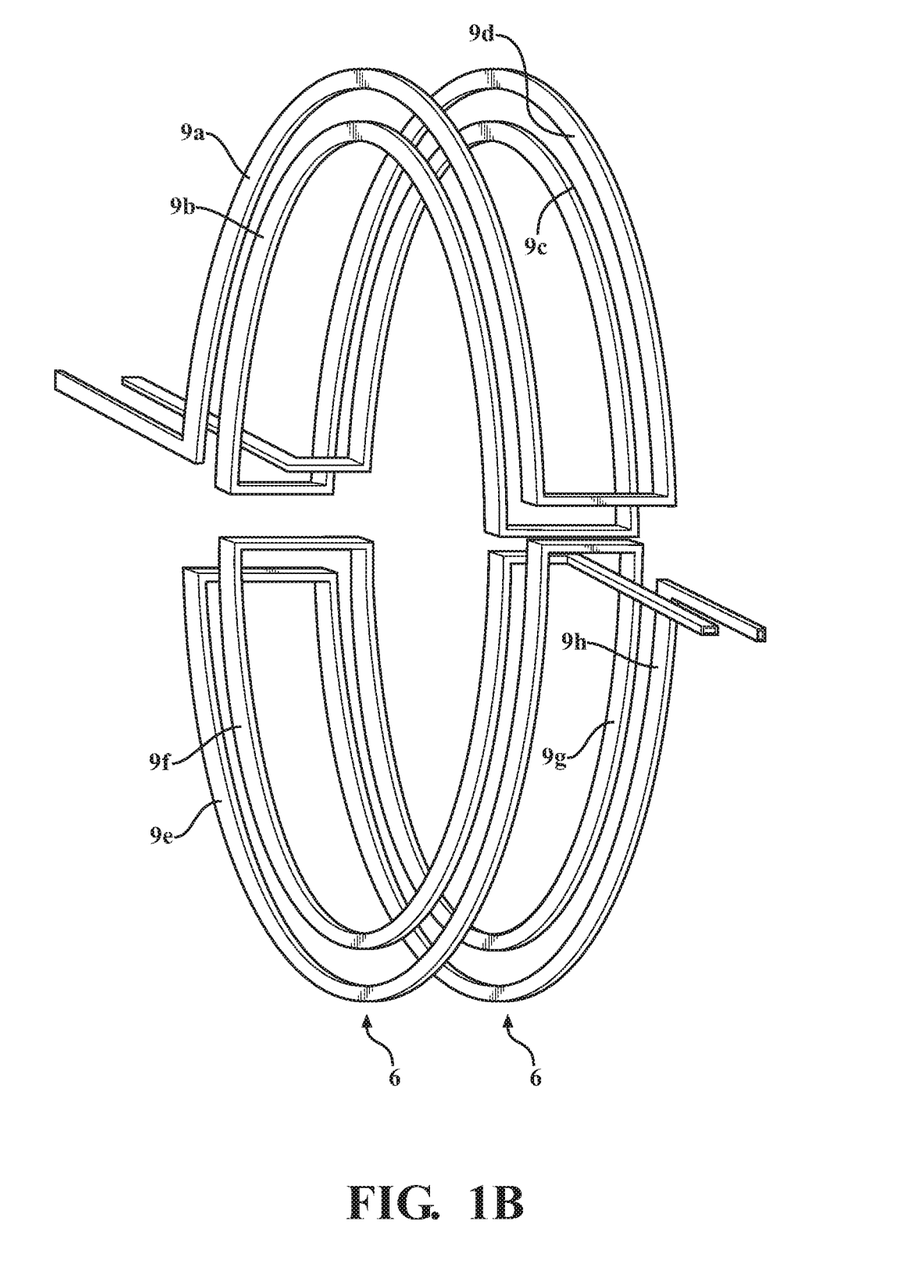
FIG. 1B is another embodiment of a four-turn induction coil as shown in FIG. 1.

Referring to FIG. 1, an IKW welding system 1 for welding pipes according to the invention includes an outer pipe 2 in nested configuration with an inner pipe 3 on one side of an induction coil 6 and a second outer pipe 4 in nested configuration with a second inner pipe 5 on the other side of the induction coil 6. Typically, the induction coil 6 is fabricated from hollow copper tubing with a continuous internal passageway for coolant such as water. The spacing between the curved coil sections and between the "U" turns are exaggerated for clarity as seen in FIGS. 1A and 1B but in practice would be more closely spaced to minimize stray field effects and maximize field reinforcement in key areas.

In these single wall applications, a two-turn induction coil will usually provide adequately uniform heat distribution across the endface of the tube ends being welded together by dedicating one full coil turn to each pipe end. Similarly, for the present invention it will generally be advantageous to have one coil turn dedicated to each pipe end. Therefore, a typical embodiment would use a four-turn induction coil.

On small diameter pipes (e.g. less than about 30 cm) it works well to have four full turn coils including a first turn 6a, second turn 6b, third turn 6c, and fourth turn 6d. The second turn 6b and fourth turn 6d are connected by a single connector 7. The first turn 6a and fourth turn 6c are connect via a first lead 8 and second lead 8a to the induction heating system (not shown).

As the pipe diameter is increased, the voltage required for a multiturn coil of adequate size becomes hazardous and less readily available from standard induction power supplies. Therefore, it becomes necessary to divide the heating task between two mirror image coils as shown in FIG. 1B which are powered separately and synchronized to ensure they each deliver equal heating. That will extend the capacity of the invention to at least 60 cm diameter pipes and provide the additional benefit of the two half circle coils only having to be retracted much less than one-half diameter to make clearance for the pipes to be brought together for the kinetic phase of the IKW process. A further advantage is that there can be a purge dam on the ID of the pipes which bridges across the gap, yet not interfere with the retraction of the coil, thereby reducing the purge volume and allowing for an internal alignment tool to be integrated with the internal purge dam.

For even larger diameter pipes (e.g. 100 cm or larger), the concept of multiple separately powered and synchronized coil units is easily extended to any number of units to keep the voltage reasonable and manageable. For example, four coil units would divide the circumference of the pipes into four equal quadrants of 90 degrees each and each coil unit would have a current flow exactly the same as shown in FIG. 1B.

It is important to have the current flow of adjacent coil turns going in the same direction to avoid cancellation of the magnetic field between the closely spaced turns as would happen between the ID and OD pipe ends on the same side. Between sides, the current can be allowed to flow in opposite directions because there is enough space between the turns to allow for flux concentrator material which would stop the field cancellation problem.

As applied to the present invention, the IKW process would be comprised of the following steps:

1. Geometry of two mating pipe ends are prepared according to one of the five main variations detailed further below, which would have been manufactured in advance in a pipe mill or at a marshalling location near to the pipeline installation site. In readiness for welding, the end faces must be clean, dry and free from rust. This can be achieved on-site shortly prior to welding by a shallow cut with a field type end facing machine tool, typically removing less than 1 mm of metal from the end faces. These commercially available end facing tools are well known to those skilled in the art of pipeline welding.
2. For controlling the welding atmosphere inside of the pipes, purge dams or purge plugs which are well known to those skilled in the art of pipeline welding. These are positioned in the inside diameter "ID" of the pipes to create a controlled atmosphere cavity along the ID of the weld, allowing the non-reactive shielding gas to displace the air from the weld faces during the induction heating phase.
3. The ready to weld pair of pipes is fed into the IKW welding machine which typically has automated pipe handling and alignment controls to bring the mating pipe end faces into coaxial, coplanar alignment. Once alignment is achieved, chucks clamp both pipes with full force required for IKW welding as determined by the primary factors of material properties and cross-sectional area. These are the two main factors which dictate the required torque and axial force necessary to perform the weld, as is understood and calculated by those skilled in the art of the IKW process.
4. After confirming correct alignment and clamping, the mating pipe ends are moved axially apart to make sufficient space for the induction coil to be inserted between the pipe ends, plus a clearance gap on each side of the coil, said gap being typically less than 5 mm. A typical 4 turn induction coil would be about 30 mm thickness, therefore the total spacing between the pipe ends during the induction heating phase of the IKW process would be about 40 mm or less.
5. A typical IKW machine has a purge chamber encompassing the outside diameter "OD" of both pipe ends, making it possible displace the air from the weld faces with non-reactive shielding gas such as argon. The induction heating phase of the IKW process does not commence until a stable atmosphere of shielding gas is established in the purge chamber. Quality of the shielding purge is typically monitored with an oxygen sensor built into the IKW machine control system.
6. The power level and frequency for the induction heating phase are programmed according to the diameter and wall thickness of the pipes, to achieve target temperature, typically in about 10 to 20 seconds, all of which is understood by those skilled in the art of IKW. Target temperature typically is about 90% of the absolute melting temperature of the pipe material and the endface temperature of the pipes are continuously monitored by optical pyrometers in a closed loop feedback control circuit governing the output of the induction power supply.
7. Once the target temperature of the induction heating phase has been achieved, the induction coil is quickly retracted and the opposing pipe ends are rapidly brought into contact with each other thus commencing the kinetic phase of the IKW process. Typically, one side is rotated with respect to the other at the prescribed velocity and total lateral displacement which will achieve the required kinetic energy input to the weld, as calculated by those skilled in the art of IKW. Total rotation is typically about 10 to 40 cm of lateral "shearing" motion which can be unidirectional or any combination of shorter, quickly reversing rotations which achieve the same total lateral displacement and kinetic energy input. It is also understood that other motions can be used to provide the required kinetic energy input, for example orbital motion or combined orbital and rotary motions, etc. This is the kinetic phase of the IKW process and typically has a duration of about 1 to 2 seconds.

8. As soon as the kinetic energy input stops, the weld cools down rapidly, primarily due to axial conduction into the adjacent cold parent metal. Within about 10 seconds the entire weld is sufficiently cooled to be unclamped and moved out of the IKW machine without risk of deformation from cantilever loads.

9. The next pair of prepared pipe ends are now moved into welding position in the IKW machine.

Starting with the most basic configuration, the pipes can all be made of the same material, whether it is high-strength steel, ferrous based alloys such as 13Chrome steel or titanium based alloys or other metals and alloys. However, to better optimize for specific applications they need not all be identical materials, but instead, the completed assembly may use advantageous combinations of different materials or grades of materials for the different layers. For example, the outer pipes might all be steel with the inner pipes all being titanium since it is known that the aforesaid IKW solid state welding process is able to simultaneously weld such different materials. Also, the relative thickness of the concentric pipes need not be equal, but rather is widely variable to optimally service various operational factors. For example, a comparatively thin inner pipe of highly corrosion resistant titanium could be paired with a thicker outer steel pipe to provide the most economical structural strength.

While IKW is the most ideally suited welding process for this invention, there are alternative weld process choices such as Friction Stir Welding (FSW) or automated GMAW or GTAW (Auto-G) welding which under certain conditions would be technically capable of constructing some of the configurations described below. For any of these alternatives to be technically feasible, the inside diameter of the innermost pipe must be large enough for the welding machinery to fit inside. Generally, that would require an ID greater than about 50 cm which excludes many well applications. Of these alternatives, only FSW is a solid-state process, therefore the Auto-G processes are still disadvantaged by all of the fusion related defects. Furthermore, all these alternatives are incremental welding processes, inherently slower, have starts and stops and are more vulnerable to variations and defects as they progress around the circumference.

Secondary objectives and advantages of this invention are varied and numerous due to its versatility, as dictated by operational factors like whether the installation is a pipeline or well casing, is located onshore or offshore, has corrosive fluid inside or corrosive environment outside and so on. For example, if the fluid being transported is corrosive, then to reduce corrosion susceptibility of the inner pipe, it should be a lower yield strength steel but the outer pipe would be high strength steel to provide the needed pressure containment and/or axial strength. In the extreme case of this scenario for example, the inner pipe could be titanium and the outer pipe could be high strength steel. Conversely, if the environment creates the major corrosion risk and the fluid being transported is non-corrosive, it may be advantageous to invert the arrangement of materials selected in the previous scenario. Importantly in both cases, there would still be the capability to instrument and monitor the annular space.

Likewise, there are multiple methods by which the annular space could be monitored, again depending upon operational factors, as well as the various configurations which are described in the following sections. As examples, the annular space could be evacuated and monitored for loss of vacuum and/or presence of hydrocarbons, or it could be pressurized with inert gas such as helium or argon and monitored for change in the pressure as well as abnormal traces of inert gas appearing in the downstream fluid.

If the pipeline is long, say 1,000 km, then it will make sense to not rely upon a single annular cavity for the entire length. Instead it would be segmented into practical lengths for monitoring purposes so that the time required for pressure anomalies to communicate from their most distal point of origin to the monitoring point provides an acceptably quick response time.

In the case of transporting viscous fluids, it is often desirable to have return flow of a solvent diluent back to the origin in which case the annular spacing could be increased to provide that return flow path for that fluid.

If the fluid being transported requires flowing temperatures significantly different from the ambient temperature, then the pipeline or well casing can be designed with an enlarged annular space which may be evacuated and/or filled with insulative materials such as aerogels.

Aside from cost, there is no technical reason limiting the number of concentric pipes to just two. There could be operational factors which justify three or possibly more concentric pipes. For example, a corrosive viscous fluid in the inner pipe which requires the innermost pipe to be corrosion resistant alloy such as 13Chrome steel and the second pipe to provide a return flow path for solvent and the outermost third pipe to provide the annular space for thermal insulation. It is noteworthy that the weld cycle time does not increase with the addition of the third pipe, since all three pipes are field welded simultaneously.

Practical size limitations for this invention are not exact because they are primarily determined by risk assessment of the application being considered. Potential applications with very low probability of failure but extremely high consequences can justify scaling up the process machinery and components up to several meters or more in diameter. For example, this invention could be used for the construction of evacuated pipelines for transporting high speed passenger capsules, in which case there would be several advantages realized besides the needed safety benefits. Since this application would require construction of thousands of kilometers of transport lines of the same diameter, there would be major reductions in construction times and costs.

While there may be applications which commercially justify three concentric pipes to be simultaneously welded, the majority of operational factors can be satisfied with just two and therefore those are the main variations depicted in the following configuration drawings. Within these five configurations, there also are further variations for the basic concept of double wall girth welds, each with specific merits to optimally satisfy various operational factors.

It is noted that all details are not depicted. For instance, threaded holes for hydrotesting or long-term monitoring are depicted at the 12 O'clock location but only for some of the configurations, due to the fact that there are many different options for that porting, depending on the configuration and the operational factors.

Configuration A

Figure 2:
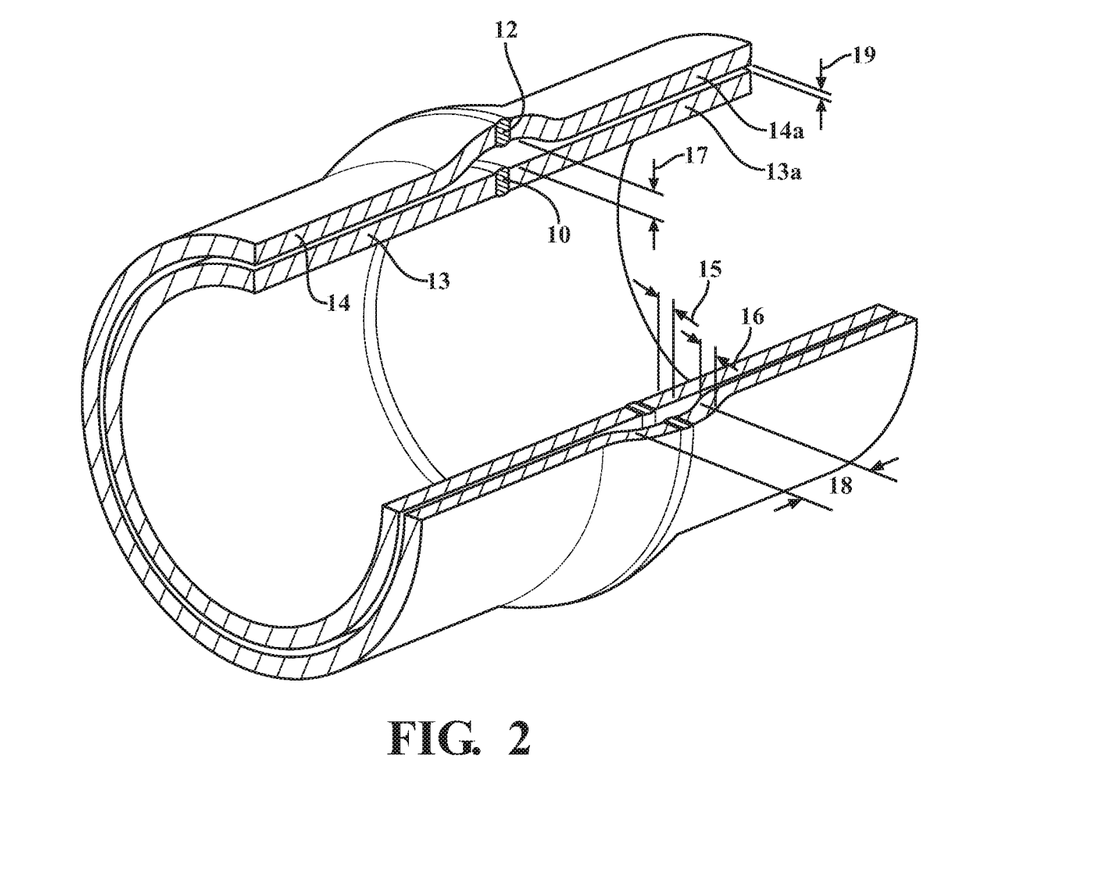
FIG. 2 is a perspective view of a cutaway of a first configuration of welded concentric pipes according to the invention.

Referring to FIG. 2, a non-limiting embodiment referred to as Configuration A, is the simplest form of this invention, thus the easiest to implement based on existing pipe mill capabilities since all it requires is for the ends of the outer pipe to be flared. A first IKW weld 10 and a second IKW weld 12 connect a first inner pipe 13 with a second inner pipe 13a and a first outer pipe 14 with a second outer pipe 14a respectively, thus forming an annular space 11 therebetween.

The annular space 11 extends circumferentially around the pipes and for the length of the pipes.

It is probably the most beneficial version for enabling monitoring of the entire length of the pipeline or well casing during its entire service life. This is the configuration which is most easily integrated into existing practices and processes for pipe manufacturing and field construction of pipelines. Inner pipes 13 and 13*a* can be standard product from pipe mills. Outer pipes 14 and 14*a* require simple flaring of the pipe ends proximate the second IKW weld 12 to create the annular clearance 17 which can be as little as about 5 mm. Length of the flared section 18 should be sufficient that there is a cylindrical portion of at least 10 mm on each pipe end. Ideally the flaring is performed in the pipe mill, but it can be done at other post manufacturing facilities. The clearance 19 between the inner and outer pipe bodies can range from an interference fit, to a slide fit, to a specified clearance. For a slide fit, there typically will be enough elastic range under the diametrical compression forces at which the IKW chucks operate to achieve traction on both pipes simultaneously, as is necessary for the torque input during the IKW weld cycle. At larger clearances, there are several options to ensure good traction between the inner 13/13*a* and outer 14/14*a* pipes, for example, shim stock (not shown) or sleeves (not shown) can be installed on the OD of the inner pipes 13 and 13*a*. Alternatively, the outer pipes can be swaged down (not shown) near the root of the flare to create an interference fit. Swaging can take various forms, for example the simplest is a full circumference swage, resulting in a full circle of contact between the pipes. Alternatively, it can be a polygon swage with a specified percentage of the circumference being formed inward to create multiple arc sections or lobes of contact, interspersed with non-swaged arc sections, the minimum being three lobes of contact. Polygon swages have the advantage of maintaining communication along the axial direction of the annular space 9. Full circumference swaging could obstruct axial communication and prevent reliable condition monitoring. Once the pipes have been locked together, the ends would be faced in a lathe operation to assure they are planar and perpendicular to the longitudinal axis. Alternatively, this end facing operation can be performed by an orbiting cutting tool while the pipe is held stationary.

Configuration B

Figure 3:
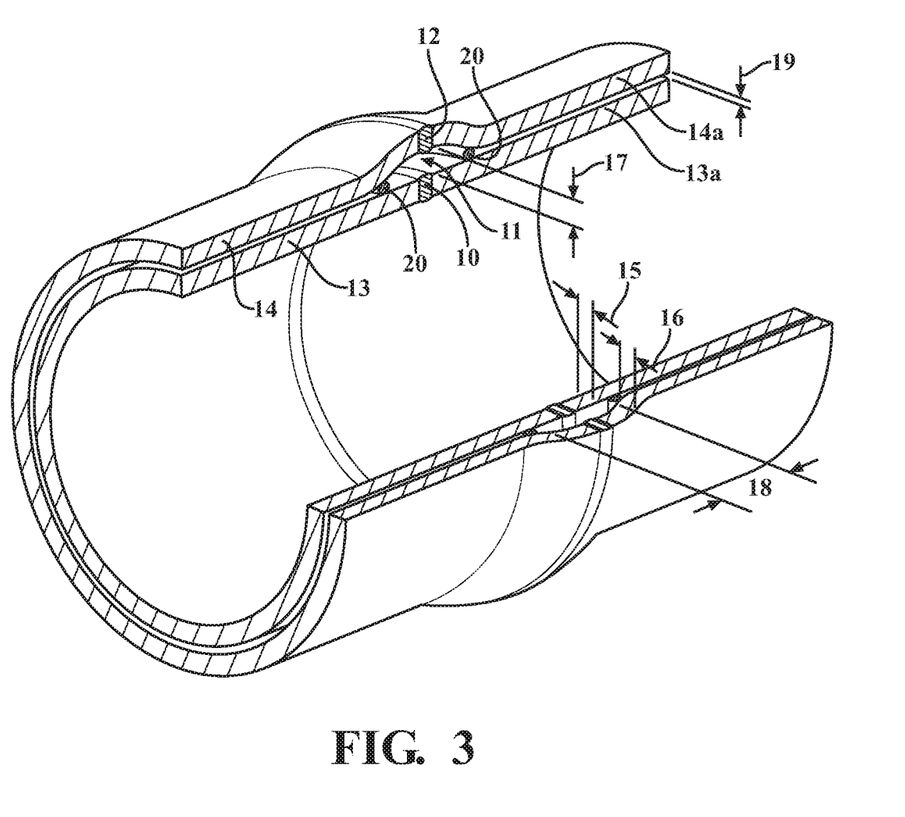
FIG. 3 is a perspective view of a cutaway of a second configuration of welded concentric pipes according to the invention.

Referring to FIG. 3, a non-limiting embodiment referred to as Configuration B is a variation of Configuration A where seals 20 are installed at the root of the flare prior to welding to create a small toroidal pressure envelope for hydrotesting of individual welds immediately after welding. The key advantage of Configuration B over A is that it retains the ability to monitor the full length of the pressure envelope. By the addition of flexible seals 20 or seal compound in the annulus at the root of the flare, Configuration B provides a way to perform isolated hydrotesting of each field weld within minutes of the weld being completed. Importantly, this does not require any significant increase in manufacturing complexity or cost. Further, by careful selection of the material used for the seals, in conjunction with the choice of fluid composition used for hydrotesting, it is possible to engineer a slow disintegration behavior so that the seal is pressure tight for long enough to produce a stable hydrotest pressure log, but then shortly thereafter its dissolution produces a communication path along the entire length of the welded pipeline. For simplicity the seals are illustrated with a round cross section like O-rings, but they could be triangular or trapezoidal shaped to better fit the end of the root of the flare in the annular cavity and more reliably stay in position during the welding process.

Configuration C

Figure 4:
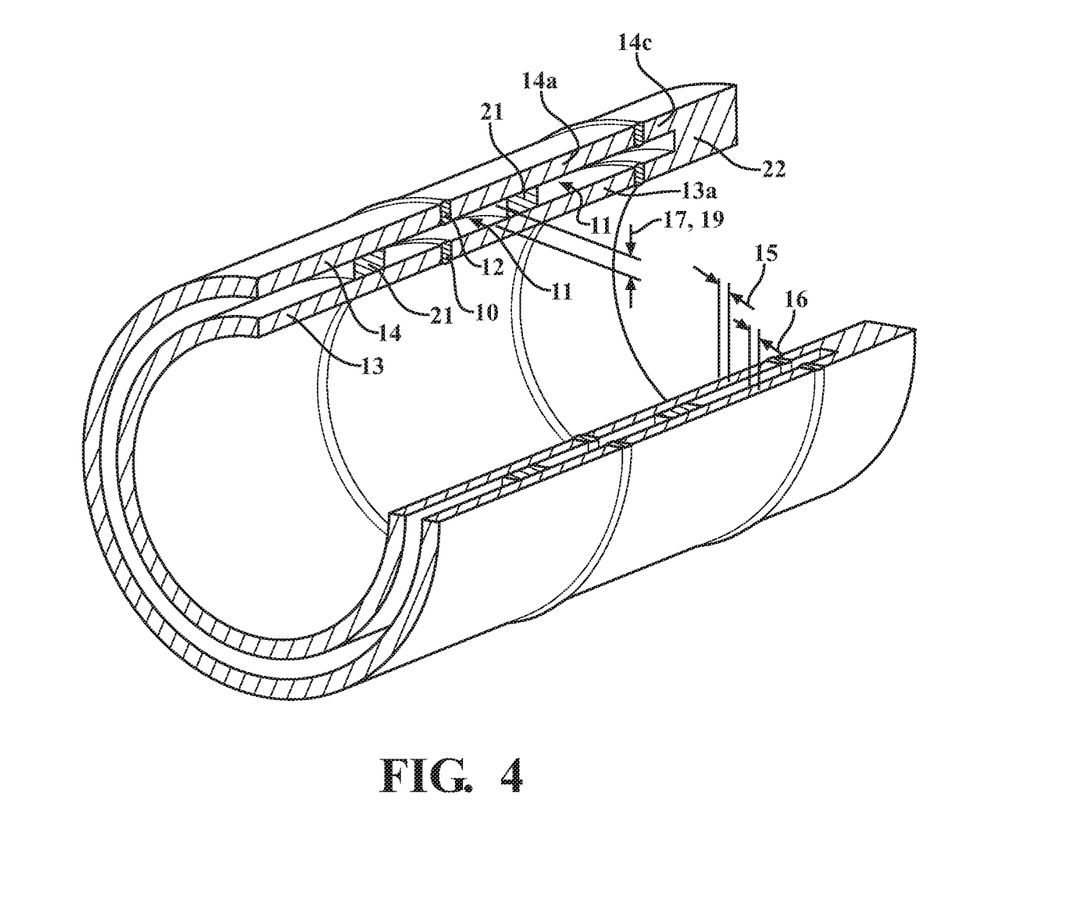
FIG. 4 is a perspective view of a cutaway of a third configuration of welded concentric pipes according to the invention.

Referring to FIG. 4, a non-limiting embodiment referred to as Configuration C is a variation of A in which the annular space between the inner and outer pipes has been increased to either provide a secondary flow path, for example for diluent return flow, or to provide space for thermal insulation between the fluid and the environment. For operational requirements where there are large differences between the fluid temperature and the ambient temperature and the fluid would react adversely, for example by precipitating asphaltenes or wax or becoming too viscous, the annular dimension 19 in the previous configurations can be increased to provide sufficient space for installation of insulative materials. An example of this material would be aerogels, augmented by reflective films on either the OD of the inner pipe or the ID of the outer pipe or both. Further reduction of thermal conductivity can be achieved by evacuation of the annular space. In order to facilitate the IKW field welding process, it is necessary to have mechanical centralizers 21 located near the pipe ends before welding. These centralizers can be any combination of ceramics, plastics, composites or metallics which have a high compressive strength and low thermal conductivity in the radial direction. Typical applications for this configuration would be heavy oil production where typically the oil is mobilized by heating and needs to be kept hot to maintain the viscosity low enough to flow. Often in these oil fields, the method of heating is steam injection into the formation, therefore the steam wells are ideal applications for well casings built with these insulating features.

Another application for this configuration is heavy oil pipelines where there needs to be a return flow path for solvent which reduces the oil viscosity without requiring heating. However, to be economically viable, the solvent must be recycled in a closed loop. For this application, the centralizers 21 must have multiple axial passageways to minimize flow restriction in the annulus.

Detail 22 illustrates the simplest possible termination design. Further improvements can be added, such as a stress relieving radius in the root of the groove, a flange on the opposite face for mechanical attachment to a valve body for example and so on.

Configuration D

Figure 5:
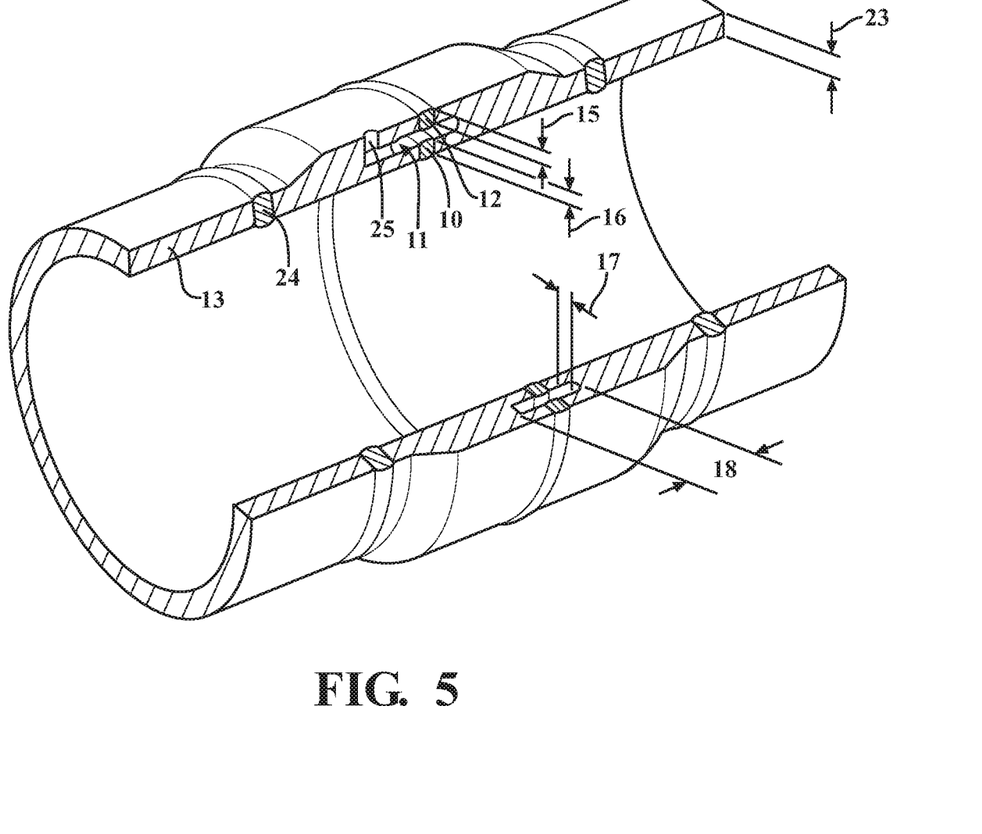
FIG. 5 is a perspective view of a cutaway of a fourth configuration of welded concentric pipes according to the invention.

Referring to FIG. 5, a non-limiting embodiment referred to as Configuration D requires more specialized preparations in the pipe mill but provides the ability to safely and individually hydrotest each weld at higher than normal pressures since the hoop stress component of a conventional hydrotest is virtually eliminated by reducing the pressure envelope to a very small toroid. Also, because the test volume is fully isolated from the interior of the pipe and so small, it enables the unprecedented ability to hydrotest each weld immediately after completion, entirely from the outside of the pipe, even while the next adjacent joint is being welded. Conventional non-destructive examination (NDE) can be performed either before or after this individual hydrotest. Some method to increase the wall thickness on the pipe ends is necessary. Two main choices are to forge upset the pipe ends or to weld a premachined ring onto the standard pipe end, preferably in a pipe mill operation using the IKW process.

Starting with standard pipe, some method of increasing the wall thickness at both ends is required by Configuration D. Up to about 30 cm diameter, one option is to forge upset the ends, followed by machining to cut in the annular groove 17, drill the pressure port 25 and generally true up the concentricity of the OD and ID with the pipe axis. Alternatively, premachined rings extending from 24 to the bond plane at 10, 12 can be welded onto plain pipe ends in the pipe mill preferably using the IKW process at the location 24. There are several advantages to this weld-on method:
(a) The metallurgy of the ring can be upgraded using more expensive alloying elements to increase the welding performance, corrosion resistance, impact toughness, etc.
(b) Premachined rings can be made with improved tolerances versus forge upset ends which then must be machined in a lathe operation turning the entire length of pipe.
(c) Weld 24 can be much more comprehensively inspected and tested in a pipe mill.
(d) Weld 24 can be post weld heat treated in the pipe mill to achieve improved properties.

It should be understood that the strength of the two concentric field welds 10 and 12 would be designed to equal or exceed the parent metal strength of pipe 3 having wall thickness 23. In the simplest case, if the upset portion has the same yield strength as the main pipe body 13, then the combined wall thickness of 15 plus 16 must equal or exceed the thickness at 13. Normally in pipeline construction, it is desirable to overmatch the weld a specified amount above the strength of the pipe body. With configuration D this can be done by either increasing the wall thickness of 15 plus 16 or by upgrading the alloy strength of a welded on premachined ring.

Configuration E

Figure 6:
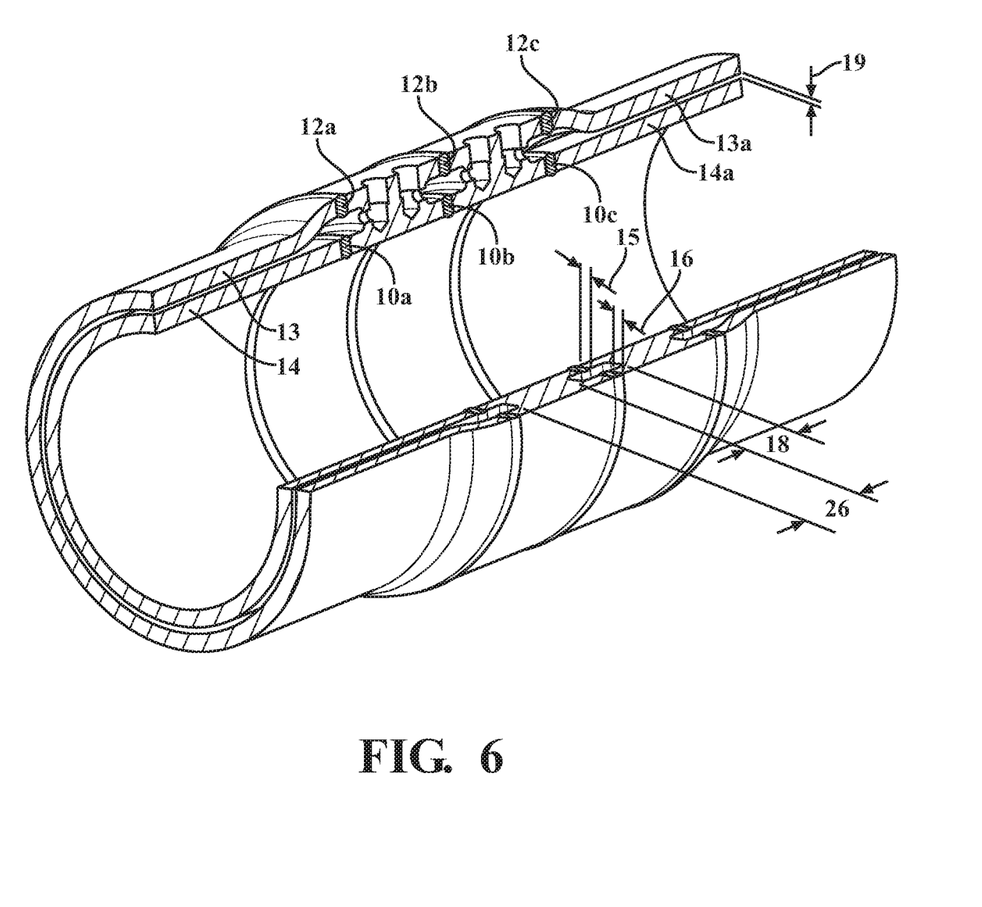
FIG. 6 is a perspective view of a cutaway of a fifth configuration of welded concentric pipes according to the invention.

Referring to FIG. 6, a non-limiting embodiment referred to as Configuration E is a hybrid of A and D which like D requires specialized preparations in the pipe mill. Starting with a thick-walled ring, having a groove cut into both endfaces. In a pipe mill operation, ideally using the IKW process, one ring is welded onto each end of each set of nested pipes. Shop hydrotesting can be performed either on the entire annular space illustrated or by using seal rings to reduce the test volume to that illustrated in Configuration B. Field welding and hydrotesting would be the same as for configuration D. Its improvement over Configuration B is to enable monitoring of 99.8% of the pressure envelope while retaining the ability to field hydrotest each weld in isolation and at higher test pressures than B. A further advantage of this configuration is that premium alloys with better weldability and other desired properties can be specified for the rings. High performance alloys like these would otherwise be too expensive to use for the entire length of pipe. Configuration E combines the maximum number of advantages of a double wall pipelines. Starting in the pipe mill, concentric pipes would be prepared as in Configuration A with the outer pipe flared after which both the inner and outer pipe endfaces are machined co-planar, flat and perpendicular to the pipe axis. Optionally, seal rings 20 as illustrated in Configuration B can be installed. Instead of being shipped to the field at this point as in A or B, premachined rings would be welded on at welds 10a and 12a in a pipe mill operation, ideally using the IKW process. Depending on the metallurgy of the pipe and rings, there may be a post weld heat treatment ("PWHT") to maximize the toughness of welds 10a and 12a and/or to control hardness to below specified limits. The prefabricated double wall pipe sections would subjected to all the normal mill NDE testing of girth welds as well as hydrotesting. In the case of PWHT, it is necessary to perform a light machining operation to remove the resultant oxide scale from the endface surfaces which will become field welds 10b and 12b. End protectors would be installed, after which the prefabricated double wall pipe sections are ready for shipment. In the field welding operation, these pipe sections would be joined and hydrotested using the same procedures as Configuration D.

By using premachined rings, Configuration E provides all of the following advantages together:
(a) It avoids the need for forge upsetting of any pipes, which would be challenging for sizes much over 30 cm diameter. All that is required is flaring of the outer pipe which is much easier to perform, especially for very large diameter and/or thick walled pipes.
(b) Rings constitute about 1 percent of the total mass of metal in each prefabricated pipe section, therefore it is very practical to increase their alloy content to overmatch the properties and performance of the main pipe body, 3 and 4. This overmatching can be in terms of yield strength, impact toughness and corrosion resistance. The alloying can also be formulated to improve the as-welded properties from the IKW process and simplify or eliminate the need for PWHT in some applications.
(c) Rings increase circular rigidity of pipe ends and can be designed with extra thickness if desired, but the minimum thickness would be approximately equal to dimensions 16 plus 17 plus about 5 mm. Increased thickness would be beneficial for maintaining circularity of large diameter pipes. This would improve the robustness of the invention in real world field welding conditions.
(d) Similar to b), there is a practical minimum axial length of the rings, which is dimension 26 plus dimension 18. Typically, dimension 26 would be about 2 cm which constitutes about 0.3% of the prefabricated assembly length. That also equals the portion of a completed pipeline length which only has a single wall thickness. However, that small portion has a substantially greater wall thickness than 15 plus 16, so it does not noticeably degrade system reliability. Stated another way, that fractional percentage of single wall pipeline does not create any meaningful risk of undetected damage before leakage occurs.

As an overall statement on all configurations, it is evident that there is no single one which is best for all applications. Rather, the best embodiment of this invention will be specific to each application and will depend upon the characteristics of what is being transported, and the corresponding risk assessment.

In all the preceding depictions of the main configurations, it is important to know that the wall thickness of the inner and outer welds (10 and 12) and/or the inner and outer pipes (15 and 16) do not necessarily need to be equal. There will be applications where it is advantageous to design them to be unequal, for example to conserve a more expensive material, or to compensate for a lower strength material and so on. If there is a large difference in wall thickness it would be advantageous to add a second turn to the induction coil heating the thicker walled pipe. For example, in reference to FIG. 1, there would be a total of six turns in the induction coil, with one turn dedicated to each of the thin wall pipe ends and two turns dedicated to the thick wall pipe ends, assuming the thick wall pipe is approximately twice the thickness of the thin wall pipe and that both pipes are made of the same alloy.

In all of the preceding configurations, the nested pipes are illustrated as being concentric, however, that is neither necessary for achieving the welds, nor desirable for all applications. For example, in wellbore casing applications, it may be desirable to have small auxiliary flow paths contained within the annular space of Configuration C. Due to the high premium on wellbore diameter, it would be advantageous to make the annular space eccentric thus creating sufficient space for auxiliary small diameter tubes to be located in the quadrant having the largest annular dimension, 19. Operated in short amplitude rotational strokes, the IKW process is easily capable of making such nested welds, despite them not being concentric.

Likewise, in the preceding configurations, the nested pipe endfaces are described as being coplanar in preparation for welding. This is generally the preferred arrangement for the IKW process, but if alternative welding processes are used then it may be desirable to have the endfaces staggered.

An advantage of the invention is improvement to field construction methods for pipelines and well casings and to provide a way to monitor them during their entire service life. However, some configurations are also well suited to factory manufacturing of multi-wall discrete tubulars which typically have mechanical end connections, such as threads or flanges. For example, discrete vacuum insulated tubing joints can be constructed with reduced thermal losses for heavy oil wells, steam injection wells, geothermal wells and so on based on variations of Configuration C as understood by those skilled in those industries.

Configuration F

Figure 7:
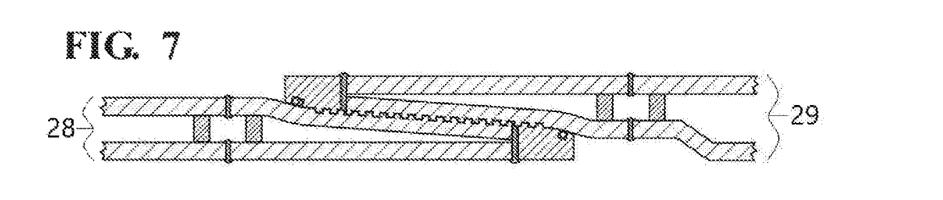
FIG. 7 is cross-sectional view of top portion of a sixth configuration of welded concentric pipes according to the invention.

Referring to FIG. 7, a non-limiting embodiment referred to as Configuration F is a variation of Configuration C in which the end product is a discrete length of insulated pipe or tubing, sealed on both ends. Products similar to this, commonly called Vacuum Insulated Tubing "VIT" are used downhole in certain oilwell applications. Its key purpose is to reduce the heat loss of either steam being injected or hot oil being produced as these fluids are conveyed through the hundreds of meters of overburden between the wellhead and the target hydrocarbon formation. These discrete lengths of insulated pipe are manufactured according to the invention, with threaded connections similar to what is currently used for non-insulated, single wall casing or tubing joints. Once delivered into the field, they would be screwed together and run downhole on the drill rig or service rig using all the same equipment and processes known to those skilled in the art of oil well drilling and oil well servicing. The most obvious utilization is for so-called thermal wells which employ high temperature steam to mobilize otherwise viscous heavy oil, abundant in Alberta, Canada and Venezuela. But there are other applications not involving steam where for example, paraffin or asphaltene or sulfur precipitation occurs due to temperature drop as the produced oil or gas is conveyed from a naturally warm formation through a cooler overburden to surface. Unchecked, this eventually blocks the flow.

In this embodiment, the completed product will have a length on the order of 10 meters and outside diameter mainly ranging from about 10 cm to 20 cm, though there is no reason to limit the diameter to that range but, the diameter is generally too small to allow for alternative welding operations other than IKW. It would be manufactured in a factory similar to a conventional Oil Country Tubular Goods (OCTG) casing or tubing mill, except said mill would be equipped with an IKW system to make the prescribed welds. As previously detailed under Configuration C, there are several potential strategies for maximizing the thermal insulative efficiency of this product by using vacuum and/or aerogels, and/or reflective foils, and/or reflective coatings in the annular space. The choice of an insulating strategy depends on the temperature of the hot fluid as well as cost constraints versus thermal efficiency savings.

Following are the key advantages of the present invention:

(a) Comparing the embodiment of FIG. 7 to current commercial VIT products made by conventional arc welding processes, it is immediately evident that the former has only a single metallic thermal conduction pathway between the inner and outer pipes at each connection. Furthermore, this single pathway has a much higher thermal resistance due to its shallow intersecting angle and long length. The adjoining vacuum cavities are substantially overlapped which improves the thermal efficiency over the prior art. It is this intersecting angle across the annular cavity which most strongly determines the insulating efficiency of an assembled string of VIT joints because in that is where most of the heat loss occurs in VIT manufactured in the current conventional ways. Therefore the worst case would be a straight metallic path across the annuls at 90 degrees. The shallower the angle, the better the thermal performance, but there are practical limits in the design and of course the threads need to have some minimum amount of taper to be practical in the oilfield industry. Considering all factors, the most practical yet high performing angle is in the range of 5 degrees to 10 degrees. But it is understood that many of the advantages of the present invention could still be attained with intersecting angles outside of that range, for example as shallow as 2 degrees at one extreme and as steep as 30 degrees at the other extreme. While it is preferred to have only one intersecting thermal conduction path across the annulus at each threaded connection between VIT joints, that requires a pin and box with expanded diameter for the box as shown in FIG. 7. Alternatively, it is understood that these VIT joints could be manufactured with a male pin configuration on both ends and then the joints would be connected with a separate short female coupling which would look like two expanded diameter box ends back to back. Such a coupling similar to the VIT design of the present invention could easily be made following much the same process and equipment as described herein. However using such a coupling would double the number of metallic thermal conduction paths across the annulus and therefore reduce the overall thermal efficiency by nearly one-half.

(b) The number of parts within and complexity of the completed product is greatly reduced as compared to current commercial VIT products. Besides reducing costs, this improves ease of handling in the field and reduces risk of improper or damaged installation since it does not require any secondary insulative components, which being non-metallic would invariably be more fragile than the steel body of the VIT.

(c) Instead of having to thread the usual 12 m long pipe lengths as currently manufactured in OCTG mills, all the connecting threads would be CNC cut on short spools (31). These components would typically be less than 50 cm long which enables improved quality at lower cost and higher productivity due to the weight and length handled being reduced by a factor of over 20× as well as rotational vibrations being entirely eliminated.

(d) Being a composite assembly, welded from discrete parts, the alloy of choice for each of the comprising parts can be advantageously selected to maximize the performance according to the purpose of each component while minimizing the cost of the final product. For example, the part which is to be threaded can be made of a higher grade steel such as 13 Chrome which has lower thermal conductivity than typical J55 or L80 steel and higher strength for improved damage resistance and increased corrosion resistance.

(e) Since the only metallic thermal conduction path from the inner to the outer pipe is through the length of the threaded section, using a more highly alloyed steel such as 13Cr has the compound benefit of further increasing the overall thermal efficiency without having to use that more expensive material for the entire VIT joint length.

(f) The separately attached Joiner ring 34 can be made from a high strength material such as 13Cr or even stronger alloy, thus providing increased damage resistance on the ends of the VIT which normally are the area most vulnerable to transportation and handling damage. Additionally, being a solid thickness of nearly double that of either the outer or inner pipe, it will be much more resistant to denting or bending.

(g) This embodiment easily accommodates double secondary seals (36 & 37) to augment the metal to metal seal at each end of the threads.

(h) The IKW process enables the use of reflective coatings such as aluminizing right up to the pipe end which is being welded, without incurring risk of contaminating the weld.

Figure 7A:
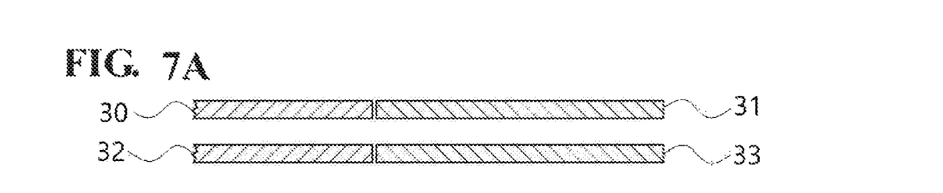
FIGS. 7A through 7F are cross-sectional views of a top portion of the manufacturing steps of the welded concentric pipes as depicted in FIG. 7.

Referring to FIGS. 7A through 7F, a non-limiting embodiment of the manufacturing process for FIG. 7 would be as follows:

Starting elements of the VIT assembly will be the outer pipe body 30, the outer pipe spool end 31, the inner pipe body 32 and the inner pipe spool end 33. The pipe bodies (30 & 32) can be random lengths, typically in the range of 10 m to 14 m, provided they are put together in matched length pairs. Alternatively, the pipe bodies can be cut to a standard length since most of the offcuts can be used for the spool ends, to minimise material wastage.

Figure 7B:
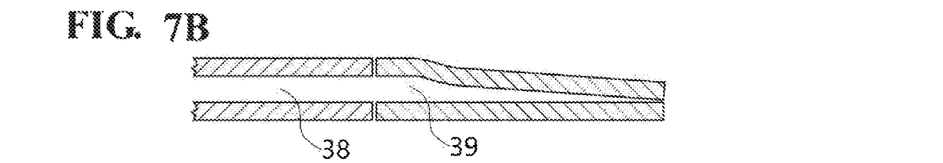

The outer pipe spool end 31 is swaged to the profile shown having 2 different conical sections to create the threading section and the seal section. Ideally this would be done at an elevated but sub-critical temperature in the range of 500 C to 700 C for ease of forming but staying below typical phase transformation temperatures. This process creates the approximate cavity shape 39 for the pin end region, while the pipe body cavity 38 will be a straight cylindrical annulus.

Figure 7C:
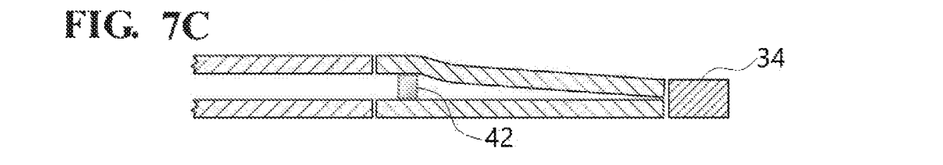

A joiner ring 34 having roughly double the wall thickness of the inner or outer pipe is cut to length and lathe turned to a square end face for welding to the outer and inner spool ends (31 & 33) which also are lathe prepared with square endfaces for welding.

Figure 7D:
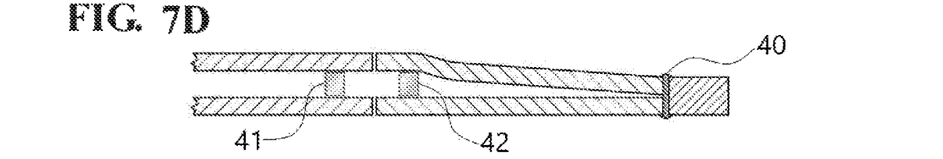

Outer and inner spool ends (31 & 33) are simultaneously welded to joiner ring 34 in a single IKW operation, using a spacer block 42 to maintain alignment during the weld cycle.

Figure 7E:
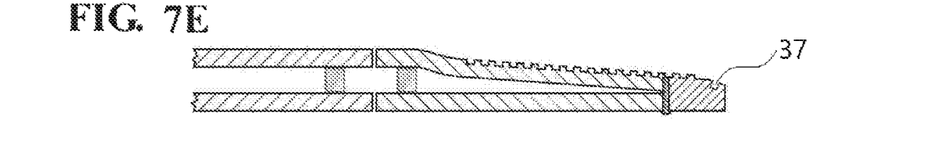

Depending upon the alloys chosen for the three components, there may be a post weld heat treatment before any machining is performed. Threads and seal groove 37 and seal faces at each end of the threads are CNC lathe cut onto the welded pin assembly in a single setup. Optionally by using an internal mandrel for chucking the welded assembly, the weld faces (43 & 44) can also be cut in the same single setup to achieve the highest practical precision.

Figure 7F:
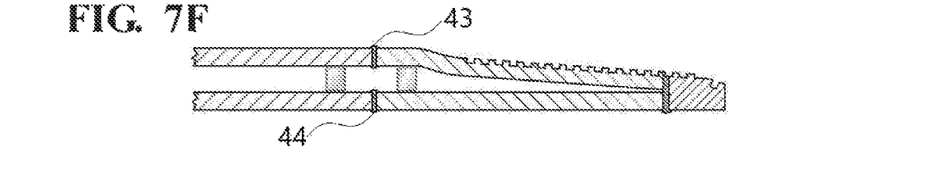

Fully machined pin assembly is now ready to weld to the outer and inner pipe bodies (30 & 32) in a single simultaneous IKW weld cycle. Before welding, all mechanical insulation materials such as foils, aerogels, etc. would be installed on the OD of the inner pipe body 32 along with spacer rings 41 at prescribed intervals along the pipe body length. An alternative to mechanical insulation is reflective coatings such as aluminizing which may be applied to the OD of the inner pipe 32 and/or the ID of the outer pipe 30, prior to welding. Spacer rings (41 & 42) with high compressive strength, but low thermal conductivity are set close to the end of the annulus to align the concentric pipes and transmit torque during the IKW weld cycle. The final result is two concentric, coplanar welds (43 & 44) which fully seal the annular space on this end of the assembly. A small access port (not shown), typically less than 2 cm diameter, in or near the joiner ring enables the otherwise sealed annulus (38 & 39) to be evacuated or baked and evacuated and then factory sealed for service.

Although the pin end subassembly of FIG. 7E could instead be machined from a single heavy wall tube, the deep wedge-shaped annulus would be difficult to bore and together with the cost of material wasted, it would usually be more expensive than the fabrication method of steps 7A through 7E. It would also preclude the option of using heterogeneous materials for optimized performance and cost. However, these considerations do not prevent a component entirely machined from heavy wall tube being used for the step as seen in FIG. 7F.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A method of sold-state induction-kinetic welding concentric pipes with an annular space therebetween, said method comprising:
heating endfaces of at least four metal pipes with an induction heating coil wherein the at least four pipes comprise two sets of at least two pipes concentrically arranged to provide a circumferential annular space between the at least two pipes of the two sets of pipes, wherein the at least four pipes define a first set of the at least two pipes concentrically arranged and a second set of the at least two pipes concentrically arranged;
forcing the endface of each of the at least four pipes into contact with another one of the endfaces of the at least four pipes together and rotating at least one of the first set and the second set of the at least four pipes in a kinetic energy welding process wherein the endface of each of the at least four pipes are welded to the respective another one of the endfaces of the at least four pipes wherein the annular space extends circumferentially in proximity to the welds;
before or after the at least four pipes are welded, drilling a hole in one of the at least four pipes, allowing for access to the annular space from outside the at least four pipes; and evacuating air in the annular space, wherein the annular space is a vacuum insulator.

2. The method of claim 1, further comprising:
repeating the steps of heating, forcing and drilling with another set of at least two pipes concentrically arranged, wherein the at least two pipes are welded to an opposite end of the previously welded pipes, wherein an annular space extends through several sections of pipes welded together end to end.

3. The method of claim 1, wherein the induction heating coil has at least four turns.

4. The method of claim 1, further comprising:
inserting a sensor to measure the volumetric pressure within the annular space.

5. The method of claim 1, further comprising:
inserting spacers in the annular space to retain substantially equal spacing between an inner and outer pipes of the at least four pipes.

6. The method of claim 1, further comprising:
preparing the pipes for welding by swaging at least one of an inner and outer pipes of the at least four pipes to retain substantially equal spacing between the inner and outer pipes.

7. The method of claim 1, further comprising:
circumferentially displacing a portion of an ends of an outer pipes of the at least four pipes prior to welding, wherein the annular space is increased proximate to an area of the welds.

8. The method of claim 1, further comprising:
prior to the steps of heating, forcing and drilling, first inserting a circumferential seal in the annular space on each side of the two sets of at least two pipes in proximity to the endfaces;
after the steps of heating, forcing and drilling a hole in the annular space but before evacuating the air in the annular space, pressure checking the integrity of the welds through the hole; and
degrading the seals to open the annular space to extend through the length of the two sets of at least two pipes.

9. A method of sold-state induction-kinetic welding concentric pipes with an annular space therebetween, said method comprising:
heating endfaces of at least four metal pipes with an induction heating coil wherein the at least four pipes comprise two sets of at least two pipes concentrically arranged to provide a circumferential annular space between the at least two pipes of the two sets of pipes;
forcing the endface of each of the at least four pipes into contact with another one of the endfaces of the at least four pipes together and rotating at least one of the two sets of the at least four pipes in a kinetic energy welding process wherein the endface of each of the at least four pipes are welded to the respective another one of the endfaces of the at least four pipes wherein the annular space extends circumferentially in proximity to the welds; and
changing a gas pressure in the annular space by one of increasing the gas pressure in the annular space, wherein the annular space is pressurized, and evacuating the gas in the annular space, wherein the annular space is a vacuum.

10. The method of claim 9, wherein the gas used in increasing the gas pressure in the annular space is at least one of air, helium, argon, and nitrogen.

\* \* \* \* \*